(12) United States Patent
Niebauer

(10) Patent No.: US 8,028,577 B2
(45) Date of Patent: Oct. 4, 2011

(54) GRAVITY SURVEY WITH RELATIVE AND ABSOLUTE GRAVIMETERS

(75) Inventor: Timothy M. Niebauer, Boulder, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 448 days.

(21) Appl. No.: 12/353,839

(22) Filed: Jan. 14, 2009

(65) Prior Publication Data

US 2010/0175472 A1 Jul. 15, 2010

(51) Int. Cl.
*G01V 7/00* (2006.01)

(52) U.S. Cl. ........................................ 73/382 G; 702/85

(58) Field of Classification Search ................ 73/382 R, 73/382 G; 702/5, 85
See application file for complete search history.

(56) References Cited

U.S. PATENT DOCUMENTS

| | | | | |
|---|---|---|---|---|
| 4,457,077 A | * | 7/1984 | Lautzenhiser | 33/304 |
| 4,935,883 A | * | 6/1990 | Hulsing, II | 700/302 |
| RE33,708 E | * | 10/1991 | Roesler | 33/304 |
| 5,339,684 A | * | 8/1994 | Jircitano et al. | 73/178 R |
| 5,922,951 A | * | 7/1999 | O'Keefe et al. | 73/382 G |
| 6,658,935 B1 | * | 12/2003 | Feinberg | 73/382 G |
| 6,993,433 B2 | * | 1/2006 | Chavarria et al. | 702/14 |
| 7,113,868 B2 | * | 9/2006 | Brewster | 702/5 |
| 7,406,390 B2 | * | 7/2008 | Niebauer et al. | 702/85 |
| 7,562,460 B2 | * | 7/2009 | Van Kann et al. | 33/366.25 |
| 7,584,544 B2 | * | 9/2009 | Van Kann et al. | 33/366.25 |
| 7,793,543 B2 | * | 9/2010 | Csutak | 73/514.27 |
| 2004/0250614 A1 | * | 12/2004 | Ander | 73/152.05 |
| 2005/0197773 A1 | * | 9/2005 | Brewster et al. | 702/2 |
| 2008/0015803 A1 | * | 1/2008 | Niebauer et al. | 702/85 |
| 2008/0271533 A1 | * | 11/2008 | Csutak | 73/514.27 |
| 2009/0044618 A1 | * | 2/2009 | DiFoggio et al. | 73/152.59 |
| 2009/0216451 A1 | * | 8/2009 | Barnes et al. | 702/5 |

OTHER PUBLICATIONS

Alan T. Herring, Introduction to Borehole Gravity, file:///d:/boreholesurveys/edconweb/introbhg.htm, Feb. 1990, 4 pages.
J.M. Brown, et al., Preliminary Absolute Gravity Survey Results from Water Injection Monitoring Program at Prudhoe Bay, SEG Int'l Exposition and 72nd Annual Meeting, Oct. 2002, 3 pages.
Ola Eiken, et al., Gravimetric Monitoring of Gas Production from the Troll Field, SEG Int'l Exposition and 74th Annual Meeting, Oct. 2004, 4 pages.

* cited by examiner

*Primary Examiner* — Hezron E Williams
*Assistant Examiner* — Samir M Shah
(74) *Attorney, Agent, or Firm* — John R. Ley

(57) ABSTRACT

A gravity survey is conducted by obtaining relative gravity measurements from a plurality of survey points using a relative gravimeter, obtaining absolute gravity measurements from a subset of a lesser plurality of the survey points designated as combination survey points, determining a correction factor related to any difference between the relative and absolute gravity measurements at each of the combination survey points, and correcting the relative gravity measurements made at the survey points which are not combination survey points using the correction factor. The absolute and corrected relative gravity measurements at the survey points constitute the gravity survey.

21 Claims, 8 Drawing Sheets

GRAVITY SURVEY WITH RELATIVE AND ABSOLUTE GRAVIMETERS

This invention relates to gravity surveys. More particularly, this invention relates to a new and improved method for conducting a gravity survey using both a relative gravimeter and an absolute gravimeter, by which to obtain a very high degree of accuracy in measurement, comparable to the accuracy available from using the absolute gravimeter at each survey point, while simultaneously reducing the cost and time required to conduct the survey.

BACKGROUND OF THE INVENTION

The gravitational force of attraction between two massive bodies is the force which results from the inherent natural attraction between the two bodies. The magnitude of the gravitational force is directly related to the mass of the bodies and is inversely related to the square of the distance between the centers of mass of the two bodies. Gravity is measured as acceleration. For instance, the free-fall acceleration due to gravity near the earth's surface of an object having a small mass compared to the mass of the earth is about 9.8 m/s$^2$.

A gravimeter is an instrument used to measure the strength or magnitude of gravity. Gravimeters are well known and typically measure the vertical component of the total gravity vector of the earth in units of acceleration at a particular location. The common unit of measurement of gravity is the "gal." A gal is a unit of acceleration defined as 1 cm/s$^2$=0.01 m/s$^2 \approx 10^{-3}$ g. These types of measurements are referred to herein as "gravity measurements."

Gravity measurements are useful for many purposes, as illustrated by the following examples. Gravity measurements are used to monitor subsurface density changes resulting from immediate to long term subterranean events. Gravity measurements are also used to monitor the influx of water when flooding a petroleum reservoir to push hydrocarbons into extraction wells. Any movement of waste gas and liquid substances stored in subsurface caverns or containments can be monitored by gravity measurements to detect whether the waste and liquid substances remain securely confined. Water management techniques make use of gravity measurements to monitor the extent to which groundwater moves or the extent to which rainwater penetrates into and saturates the soil.

In all of these uses and others, changes in the quantity of the monitored substance, such as the oil, water or gas, alter the density of the volume of mass at the monitored location. That change in mass, through Newton's law, changes the gravity around and above that specific monitored location. For example, in the absence of any other change, the depletion of petroleum from a subterranean reservoir decreases gravity at the location above the reservoir due to the reduction of petroleum in the reservoir. Similarly, flooding a petroleum reservoir with water increases gravity above the reservoir because the water replaces a less dense substance or fills a void. Dynamic effects may also be determined using gravity measurements. For example the movement of groundwater and waste substances from their previous locations creates temporal changes in gravity which may be sensed. The extent of movement of the substance can be determined from gravity measurements, and with appropriate accuracy, the volumetric quantities of the moving substance can also be determined.

The change in mass of the monitored substance is normally very small compared to the mass of the surrounding earth that defines the reservoir, cavern or confinement of the substance. Consequently, the change in gravity is usually very small. Nevertheless, the change does occur and gravimeters are capable of measuring such relatively small changes in gravity.

Gravimeters fall into two categories: a relative gravity measurement instrument known as a relative gravimeter, and an absolute gravity measurement instrument known as an absolute gravimeter. Both types of gravimeters measure the vertical component of the earth's total gravity vector. Gravimeters are distinguished from another type of measurement instrument known as a gradiometer. A gradiometer is used to measure a gradient, differential, difference or rate of change of gravity. Gradiometers are therefore used to measure differential gravity, without regard to the magnitude of gravity. Gravimeters, not gradiometers, are used in gravity surveys of the type described herein.

The typical relative gravimeter suspends a mass of known quantity with a spring-like device. An increase in gravity interacts with the known mass to slightly stretch or elongate the spring-like device. Conversely, a decrease in gravity allows the spring-like device to constrict slightly. In both cases, the position of the known mass changes by a slight amount due to the elongation or constriction of the spring-like device. The amount of physical displacement of the known mass is directly related to the magnitude of gravity at that location and time.

An absolute gravimeter is a much more technically sophisticated, delicate, expensive and physically larger instrument than a relative gravimeter, at least at the present time. In an absolute gravimeter, a mass of known quantity is positioned within a chamber which has been evacuated as much as possible to approximate a complete vacuum. A mechanism lifts the known mass and releases it to freefall within the chamber. A laser beam monitors movement of the free-falling mass, and an extremely accurate clock measures the time required for the mass to fall a specific distance or measures the speed of the free-falling mass at a specific time. By utilizing the distance and/or speed data, the magnitude of gravity acting upon the known mass at the time of the test is calculated. The gravity measurements from an absolute gravimeter are very precise, due principally to the technological sophistication of the device.

In a relative gravimeter, the spring-like device which suspends the known mass is susceptible to many influences that degrade the accuracy of the gravity measurements obtained. Changes in temperature and the age of the spring-like device can change its spring characteristics and hence change the displacement of the known mass. Changes in atmospheric pressure can also change its spring characteristics. The changes in the spring characteristics of the spring-like device are referred to as drift. Shocks caused by physical movement of the gravimeter can alter the at-rest position of the known mass. Changes in the at-rest position of the known mass are referred to as offset or tare. If these changes are not recognized and corrected, the resulting changes are interpreted incorrectly as influenced by gravity.

Because of their influences and responses, relative gravimeters are typically less reliable and less accurate than absolute gravimeters for measuring gravity. The effect of changes in temperature, pressure, drift and tare can mask any change in the magnitude of gravity, making it impossible to accurately measure gravity, particularly those small gravity changes resulting from the above-described changes in subsurface events.

In contrast, the gravity measurements obtained by using an absolute gravimeter are very accurate. However, the sensitivity and complexity of the absolute gravimeter has made it impossible, tedious, time-consuming and/or very difficult to employ an absolute gravimeter other than in a controlled scientific laboratory. Only recently have field-usable absolute gravimeters been developed, but such field-usable absolute gravimeters are expensive, in the neighborhood of US $300,000-500,000, which is about five or more times the price of a relative gravimeter.

The use of a field-usable absolute gravimeters in a typical gravity survey is further complicated by the requirement to obtain gravity measurements at a large number of survey points. A typical gravity survey may involve measuring gravity at many hundreds of different locations within a particular geographical or survey area. It may take as much as one-half of a day to set up a field-usable absolute gravimeter at each survey point. Even though movable, the sensitivity and fragility of a field-usable absolute gravimeter complicates its transportation from one survey point to another. Care must be taken to avoid damaging the delicate components of the absolute gravimeter when moving it. Consequently, the amount of time required to measure gravity at each of the many survey points of a typical survey area makes the use of absolute gravimeters impractical, prohibitive and almost impossible from both a logistical standpoint and a cost standpoint.

Due to the expense of a field-usable absolute gravimeter and the length of time required to obtain many gravity measurements using it, gravity surveys are typically conducted using a relative gravimeter. Gravity surveys conducted with a relative gravimeter typically involve a technique called "looping." Looping involves obtaining gravity measurements at a starting point, at a series of intermediate points, and then again at the starting point. The sequence of gravity measurements begin and end at a single point, thereby creating a loop of gravity measurements.

The purpose of looping is to determine the amount of error in measurement that the relative gravimeter has suffered over the course of the measurement loop between the starting and ending gravity measurements. If the beginning and ending gravity measurements are different, as is typical of the case due to the above-described influences on relative gravimeters, the amount of the error determined by the difference in the beginning and ending gravity measurements at the starting point of the loop becomes a correction factor which should be applied to the intermediate gravity measurements. The correction factor is based on the assumption that the error changed in relation to time between the beginning and ending survey points in the loop. Consequently, the amount of correction applied to the first intermediate gravity measurement in the loop will generally be less than the amount of correction applied to the last intermediate gravity measurement in the loop. Of course, the underlying assumptions in applying the correction factor to all of the intermediate gravity measurements may itself also introduce some unknown inaccuracy in those corrected gravity measurements. However, correcting the intermediate gravity measurements results in considerably more accuracy than is available from the uncorrected relative gravity measurements.

Reducing the number of intermediate points within a survey loop reduces the number of gravity measurements that are affected by the inaccuracies inherent in relative gravity measurements in a looping survey. It is for this reason that a large number of loops are typically utilized in conducting a relative gravimeter gravity survey. Furthermore, to even better increase accuracy, the loops also include multiple survey points which have been measured in other loops, thereby resulting in an overlapping pattern of loops. The extent of looping increases the number of individual gravity measurements required and the amount of processing required to apply correction factors to the measurements obtained. Increasing the use of the relative gravimeter also increases the risks that the relative gravimeter will suffer errors due to the influences from the movement of the relative gravimeter required when executing the multiple loops.

Looping also increases the time and cost of conducting a gravity survey using relative gravimeters. Time is consumed because of the necessity to continually backtrack to previously-visited survey points in each loop. Many loops are required to complete the entire gravity survey. Because of the large number of gravity measurements required in a looping gravity survey, the relative gravimeter and other survey equipment experience additional wear and tear. Additional processing of the gravity measurement data is required because the data obtained from the many overlapping survey loops must be analyzed and correlated to derive the correction factors and apply those correction factors to obtain accurate gravity measurements.

SUMMARY OF THE INVENTION

The present invention involves conducting a gravity survey in a more cost-effective, less time-consumptive and more accurate manner using relative gravimeters to obtain relative gravity measurements at a substantial majority of survey points and using an absolute gravimeter to obtain absolute gravity measurements at a considerable fewer number of survey points. The present invention makes it possible to substantially eliminate looping.

In executing the present invention, gravity measurements are conducted at intermediate survey points and at a considerably lesser number of combination survey points. Relative gravimeters are used exclusively at the intermediate survey points, and both relative and absolute gravimeters are used at the combination survey points. The gravity measurements from the relative and absolute gravimeters at the combination survey points are used to obtain correction factors for the gravity measurements from the relative gravimeters at the intermediate survey points. The necessity to loop to obtain the correction factors is eliminated. Consequently, the gravity survey is executed more quickly, with less personnel and equipment costs, and with fewer requirements for processing the information obtained.

One aspect of the invention involves a method of conducting a gravity survey. Survey points from which to obtain gravity measurements are identified and organized into one or more survey point groups. Each survey point group has a first combination survey point, at least one intermediate survey point, and a last combination survey point. Relative gravity measurements are obtained from each of the survey points of each survey point group. Absolute gravity measurements are also obtained from the first and last combination survey points of each survey point group. A correction factor is determined which is related to any difference between the relative and absolute gravity measurements at each of the combination survey points. The correction factor is applied to the relative gravity measurements at the intermediate survey points to correct those relative gravity measurements. The gravity survey is established by the absolute gravity measurements at the combination survey points and uncorrected relative gravity measurements at the intermediate survey points.

Another aspect of the invention is a method of conducting a gravity survey using an absolute gravimeter and a relative gravimeter. A plurality of survey points are identified from which to obtain gravity measurements for the gravity survey. Relative gravity measurements are obtained at each of the survey points using the relative gravimeter. The plurality of survey points is divided into a subset of a lesser plurality of survey points each of which is designated as a combination survey point. Absolute gravity measurements are obtained at each of the combination survey points using the absolute gravimeter. The relative gravity measurements and the absolute gravity measurements at each of the combination survey points are compared, and a correction factor related to any difference between the relative and absolute gravity measurements at each of the combination survey points is determined. The absolute gravity measurements are used as accurate values of the gravity at the combination survey points in the gravity survey. Those survey points which are not combination survey points are designated as intermediate survey points. The relative gravity measurements made at the intermediate survey points are corrected using the correction factor. The corrected relative gravity measurements are used as accurate values of gravity at the intermediate survey points in the gravity survey.

Other aspects of the invention include recording the time at which each relative gravity measurement is obtained, determining the correction factor as a function of time, correcting the relative gravity measurements in relation to the time that the relative gravity measurements were obtained, calculating the correction factor based on drift and offset of the relative gravity measurements supplied by the relative gravimeter, obtaining only one relative gravity measurement at each survey point, and using a least squares method to correct the relative gravity measurements.

A more complete appreciation of the present invention and its scope may be obtained from the accompanying drawings, which are briefly summarized below, from the following detailed description of a presently preferred embodiment of the invention, and from the appended claims.

DETAILED DESCRIPTION

Figure 1:
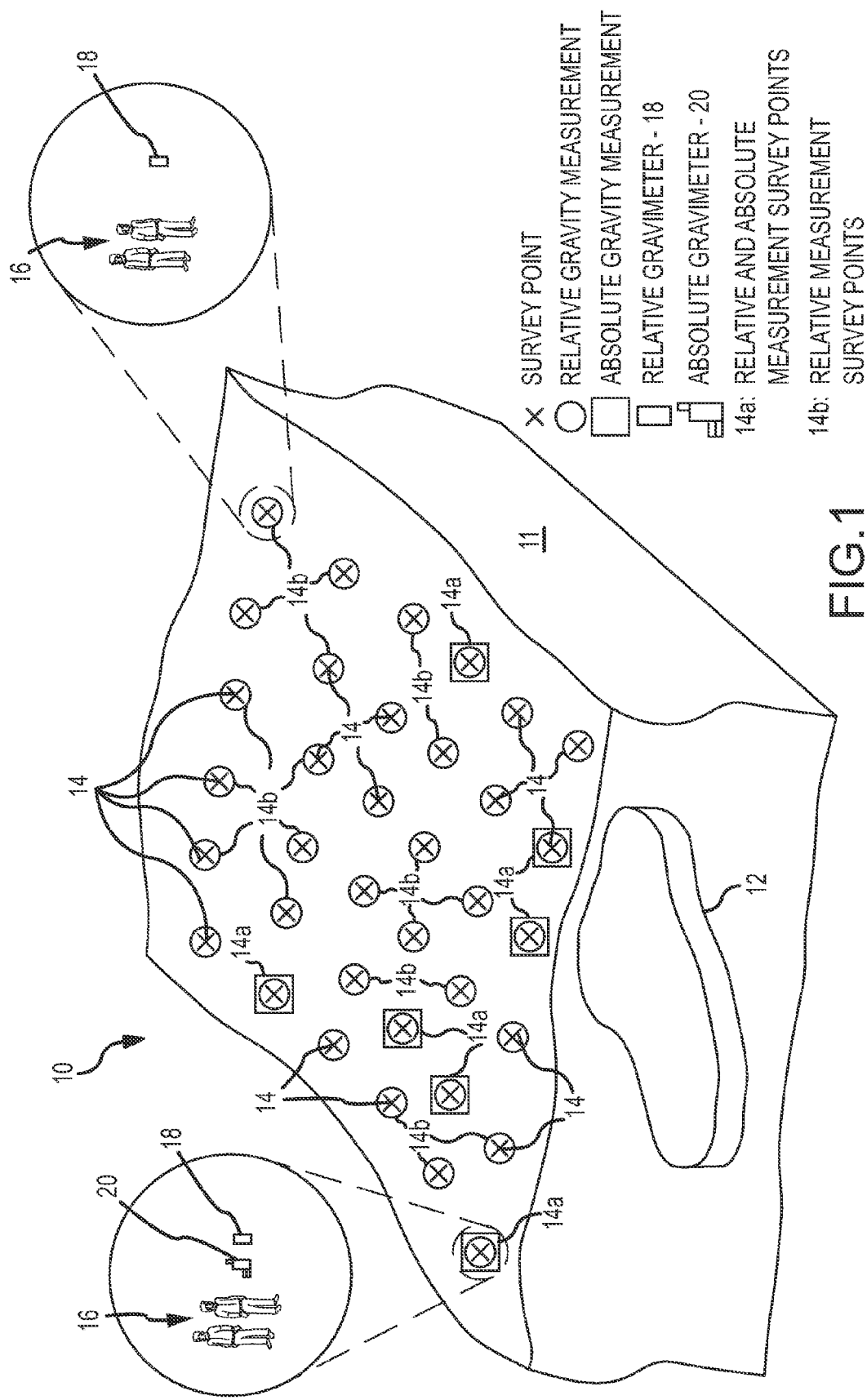
FIG. 1 is an illustration of a portion of the earth above a subterranean reservoir upon which a gravity measurement survey incorporating the present invention is conducted at a plurality of survey points using both relative and absolute gravimeters.

A gravity survey incorporating the present invention is described in connection with the example illustrated in FIG. 1. In this example, the gravity survey is conducted over a geographic area 10 on the surface of the earth 11 located above a subterranean oil reservoir 12. Gravity measurements are obtained from numerous preselected survey points 14 (each indicated by an "x") by a gravity survey team 16 using a relative gravimeter 18 and an absolute gravimeter 20. Relative gravity measurements are obtained at each of the survey points 14 using the relative gravimeter 18. A relative gravity measurement is indicated by a circle surrounding the survey point. Absolute gravity measurements are obtained at a considerably lesser number of the survey points using the absolute gravimeter 20. An absolute gravity measurement is indicated by a square box surrounding the survey point. Those survey points 14 at which both relative and absolute gravity measurements are made are each designated as a combination survey point 14a. Those survey points 14 at which only a relative gravity measurement is made are each designated as an intermediate survey point 14b.

Any difference between the relative gravity measurement and the absolute gravity measurement at each combination survey point 14a is used to obtain a correction factor for correcting the relative gravity measurements obtained at the intermediate survey points 14b. A correction factor is applied to all of the relative gravity measurements made at all of the intermediate survey points 14b, in the manner described below, to obtain corrected relative gravity measurements comparable in accuracy to an absolute gravity measurement at those intermediate survey points 14b, without the necessity for looping. Of course, the absolute gravity measurements made at the combination survey points 14a are usually accurate without correction, due to the accuracy of measurement resulting from use of the absolute gravimeter 20. Occasionally, gravity interference or noise causes the absolute gravity measurements to deviate slightly from the actual gravity values. Models can be applied to correct the absolute gravity measurements in order to minimize these effects if desired. The accurate gravity measurements thus obtained become the gravity survey and may thereafter be used for a variety of purposes, such as for example modeling the subterranean oil reservoir 12.

Figure 2:
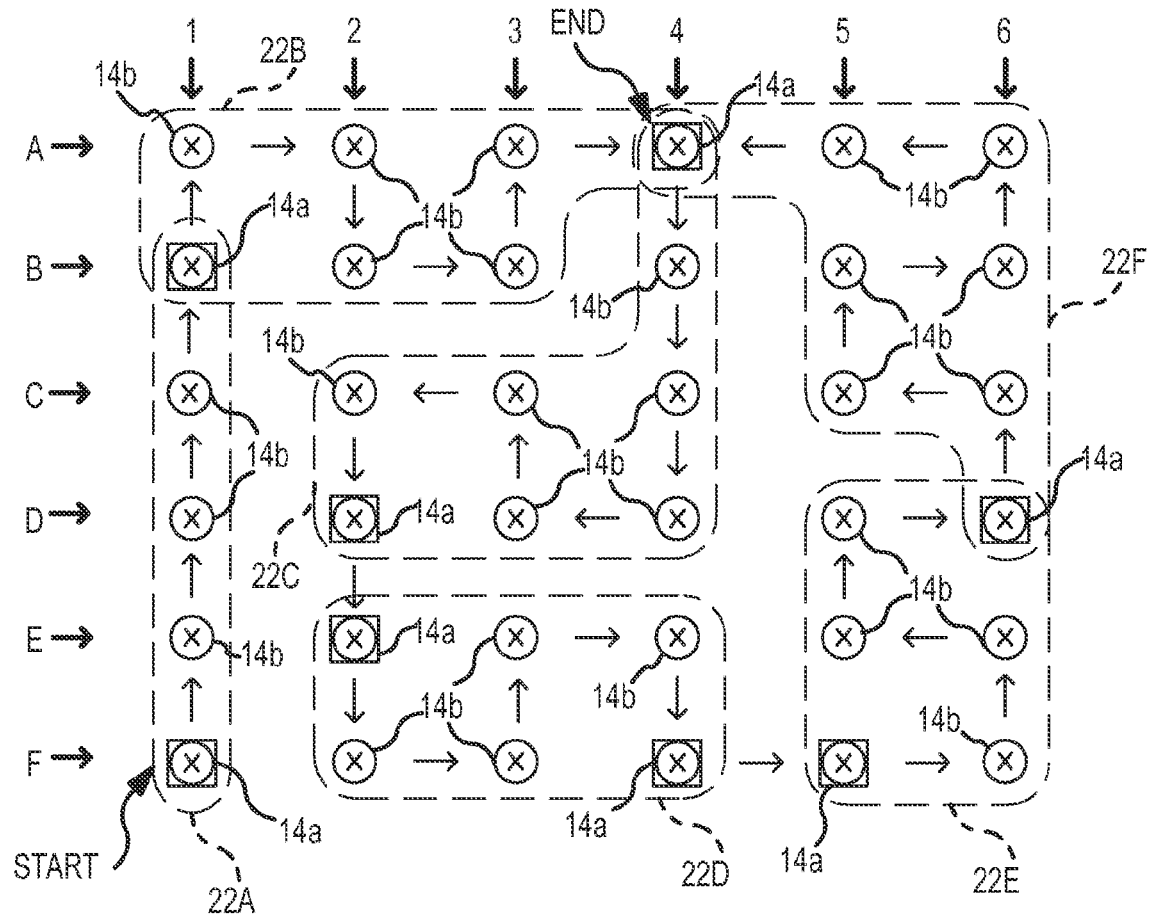
FIG. 2 is a diagrammatic and matrix-like representation of the survey points shown in FIG. 1 organized into survey point groups, with marginal reference indications to identify specifically each survey point.

An exemplary approach to grouping the survey points 14 for efficiently conducting the gravity survey without looping is shown in FIG. 2. Each of the survey points 14 is included in at least one survey point group, for example in survey point groups 22A, 22B, 22C, 22D, 22E and 22F. Typically, at least one survey point 14 in each survey point group will be common to another survey point group. Each of the survey point groups 22A-22F includes two combination survey points 14a and at least one and preferably multiple intermediate survey points 14b. Two or more of the survey point groups 22A-22F may include a common combination survey point 14a, as is illustrated by survey point groups 22A and 22B, 22B and 22C and 22F, and 22E and 22F.

Gravity measurements are obtained at each of the survey points 14 within all of the survey point groups 22A-22F. All of the absolute and relative measurements are taken as closely as possible together in time, so that any extremely slight variations in the gravity caused by subterranean events during the time required to execute the gravity survey will not significantly influence the accuracy of the gravity survey. If all of the gravity measurements are made as contemporaneously as possible, the effect of any slight changes in subterranean events should have no significant influence on the accuracy of the gravity survey. Gravity surveys are generally used for comparison purposes, where one gravity survey is compared to another gravity survey that was taken months or years before or after the first gravity survey. Obtaining all the relative and absolute gravity measurements in a relatively contemporaneous manner, for example in a matter of days or a few weeks, will usually be regarded as imparting sufficient accuracy in a gravity survey.

The order of the survey points in each survey point group 22A-22F is preestablished so that the relative gravity measurements progress in an predetermined sequence beginning with a combination survey point 14a and ending at the other combination survey point 14a of each survey point group. Arrows shown in FIG. 2 illustrate an exemplary sequence for obtaining relative gravity measurements at each survey point 14 of each survey point group 22A-22F. The order in which each of the relative gravity measurements are made in each survey point group 22A-22F is of no particular consequence, except that the relative gravity measurements can be obtained more efficiently if the shortest path between the survey points is chosen beginning at one combination survey point 14a and ending at the other combination survey point 14a of each survey point group. It is important, however, that the time at which each of the relative gravity measurements is obtained is recorded along with the value of the gravity measurement. The correction factor which will be applied to the relative gravity measurements at the intermediate survey points 14b is a function of time, as described below. Recording the time of each relative gravity measurement is therefore important in establishing the current correction factor to be applied to the relative gravity measurements made at each intermediate survey point 14b.

The absolute gravity measurements at the combination gravity points 14a may be taken for the entire gravity survey at all of the survey point groups 22A-22F in one sequence, or the absolute gravity measurements can be taken in conjunction with the relative gravity measurements in each of the survey point groups 22A-22F, or a combination of both techniques may be employed. The example described below in conjunction with FIG. 2 discusses making the absolute and relative gravity measurements together at the combination survey points 14a. The best accuracy is obtained by first obtaining the absolute gravity measurements in each of the survey point groups, and thereafter obtaining the relative gravity measurements for the all of the survey points in each survey point group. Making all of the absolute gravity measurements at one time has the advantage of requiring less movement of the absolute gravimeter 20, and therefore exposing the absolute gravimeter 20 to less potential for disruption or damage due to transportation and movement.

An exemplary sequence of making the absolute and relative gravity measurements associated with the survey point group 22A illustrates how the gravity measurements are made for all of the survey points 14 and survey point groups 22A-22F. The arrows between the survey points 14 indicate an exemplary relative order in which the survey points 14 are visited by the survey team 16 (FIG. 1) to obtain gravity measurements. The first survey point 14 of the survey point group 22A from which gravity measurements are obtained is designated at F1. Since survey point 14 designated at F1 is a combination survey point 14a as well as the starting survey point for the gravity survey itself as a whole and for the survey point group 22A, both relative and absolute gravity measurements are obtained at the survey point 14 designated at F1. The survey team then travels to the three intermediate survey points 14b designated at E1, D1 and C1 of the survey point group 22A and obtains relative gravity measurements at those intermediate survey points 14b. Then the survey team travels to combination survey point 14a designated at B1 and obtains both relative and absolute gravity measurements at that combination survey point 14a. After the survey team 16 has completed obtaining the relative and absolute gravity measurements at the combination survey point 14a designated at B1, all of the absolute and relative gravity measurements associated with the combination and intermediate survey points 14a and 14b of survey point group 22A, respectively, have been obtained. The survey team 16 can progress to begin obtaining gravity measurements at the survey points 14 in the next survey point group 22B.

The first combination survey point 14a designated at B1 of survey point group 22B is also common to the survey point group 22A. Under this circumstance, the absolute and relative gravity measurements need not be repeated at the combination survey point 14a designated at B1, provided that the gravity survey of the survey point group 22B progresses immediately on from the combination survey point 14a designated at B1. However, if there is a delay associated with starting the gravity survey of the survey point group 22B, the relative gravity measurement at the combination survey point 14a designated at B1 should be repeated at the start of the gravity survey of the survey point group 22B, to accurately determine the correction factor that will apply to the relative gravity measurements at the intermediate survey points 14b of the survey group 22B. The survey team then progresses to making the relative gravity measurements at the intermediate survey points 14b designated at A1, A2, B2, B3 and A3. At the combination survey point 14b designated at A4, both relative and absolute gravity measurements are made. With these measurements, all of the gravity measurements at the survey points 14 of the survey point group 22B have been obtained.

The absolute and relative gravity measurements are thereafter collected from the survey point group 22C in substantially the same manner that has been described in connection with survey point groups 22A and 22B. If the gravity survey of survey point group 22C commences immediately after finishing the gravity survey of survey point group 22B, the relative gravity measurement at the combination survey point 14a designated at A4 need not be repeated. The gravity survey of the survey point group 22C concludes with relative and absolute measurements at the combination survey point 14a designated at D2. The combination survey point 14a designated at D2 is not a common combination survey point with any other survey point group.

Each survey point group may be started and/or ended with combination survey point(s) 14a which are not in common with other survey point groups. The reasons for doing vary for subjective reasons, but those reasons may be related related to geographical spacing and characteristics of the subterranean area of interest which is the subject of the gravity survey. The gravity survey of survey point groups 22D and 22E begins and ends with combination survey points 14a designated at E1 and F4 and at F5 and D6, respectively, and are thus examples of survey point groups which do not share their beginning and ending combination survey points 14a with any other survey point group. Survey point groups 22A, 22B, 22C, and 22F share at least one of their beginning or ending combination survey points 14a with another survey point group.

The gravity surveys of the survey point groups 22D, 22E and 22F are completed in the same manner previously described. If the sequence of progressing through the survey point groups is as shown in FIG. 2, a final concluding relative gravity measurement is made at the ending combination survey point 14a designated at A4, because the original relative gravity measurement made at the combination gravity survey point 14a designated at A4 when making relative gravity measurements in the survey point group 22B will have been made at a sufficiently earlier time that it will not be reliable in establishing the correction factor for correcting the relative gravity measurements made at the intermediate gravity points 14b in the survey point group 22F.

The gravity survey at all of the survey points 14 shown in FIG. 2 is obtained without repeating previous measurements except to the extent that a relative gravity measurement at the ending combination survey point 14a designated at A4 must be repeated because of the time lapse between the elapsed time of the two relative gravity measurements at that combination survey point. It is possible to avoid making any repetitious measurements by ordering the sequence of the gravity measurements in a predetermined manner to avoid returning to any survey point 14 at which gravity measurements was made previously, and doing so in a temporal manner to assure that the values obtained at each of the combination survey points 14a are valid for the entire survey point group.

Notice that ending of the gravity survey at the combination survey point 14a designated at A4 is distinguished from traditional looping. Traditional looping involves using two relative gravity measurements and one absolute gravity measurement from a single survey point in order to correct a drift in the relative gravity measurements obtained between the two relative gravity measurements at the survey point where the absolute gravity measurement was also made. Associating two absolute gravity measurements with each survey point group, as described in FIG. 2, avoids the requirement of looping back to a single relative survey point. By avoiding the looping requirement, the survey team can travel from one survey point to the next in an efficient manner to obtain gravity measurements, without backtracking. Reducing the amount of backtracking by the survey team while collecting gravity measurements for the gravity survey reduces the total travel time required to perform the gravity survey. Reducing the total travel time of the survey team reduces the costs of performing the gravity survey as well as increases the speed with which all of the gravity measurements are obtained.

To assure the best accuracy, the relative gravity measurements for each survey point group should be fresh or up-to-date. The first survey point group of the gravity survey will utilize no previous relative gravity measurements, but the relative gravity measurements made in the second and subsequent survey point groups may be removed a considerable amount in time from the common relative gravity measurements made in connection with earlier-measured survey point groups. If a previous relative gravity measurement exists for the first combination survey point of the current survey point group undergoing measurement and that previous relative gravity measurement is fresh, then the previous relative gravity measurement may be used in the survey of the current survey point group.

A previously made relative gravity measurement is considered fresh or up-to-date if the amount of time elapsed since the previously made relative gravity measurement is short, the same relative gravimeter which was used to obtain the previous relative gravity measurement is also used to make the other relative gravity measurements of the current survey point group, and the relative gravimeter has not been subjected to any external influence which might have caused a differing offset to occur since the previous relative gravity measurement was obtained. If the decision is made not reuse a previously made relative gravity measurement, new relative gravity measurements are made during the course of surveying the current survey point group. Of course, to obtain the best accuracy, the same relative gravimeter should be used to obtain the relative gravity measurements of all survey points in the current survey point group.

The same relative gravimeter should be used to make the relative gravity measurements at the survey points of the current survey point group to avoid the numerous external influences which influence the relative gravity measurements. The external influences include temperature, pressure, tare or offset and drift. Using the same relative gravimeter causes the relative gravity measurements to vary according only to a single set of error-inducing variables particular to that relative gravimeter. Using multiple relative gravimeters to conduct a gravity survey of a single survey point group would introduce multiple sets of varying error-inducing variables which could be difficult to correct, unless each relative gravimeter was separately corrected and multiple relative gravity measurements were made at each combination survey point using the different relative gravimeters.

Some locations within the geographic area 10 (FIG. 1) may be of more interest than others, and it may be desirable to obtain absolute gravity measurements from those locations. More absolute gravity measurements may be pre-planned in a higher than average concentration at those locations. An example of this situation is shown by the combination gravity points 14a designated at D2 and E2 and at F4 and F5. A large concentration of absolute gravity survey points may result in some of those absolute gravity measurements not being part of a survey point group, or may result in some of the survey point groups in the vicinity of that location having fewer-than-average intermediate survey points 14b, or it may result in some survey point groups not sharing combination survey points with other survey point groups.

Figure 3:
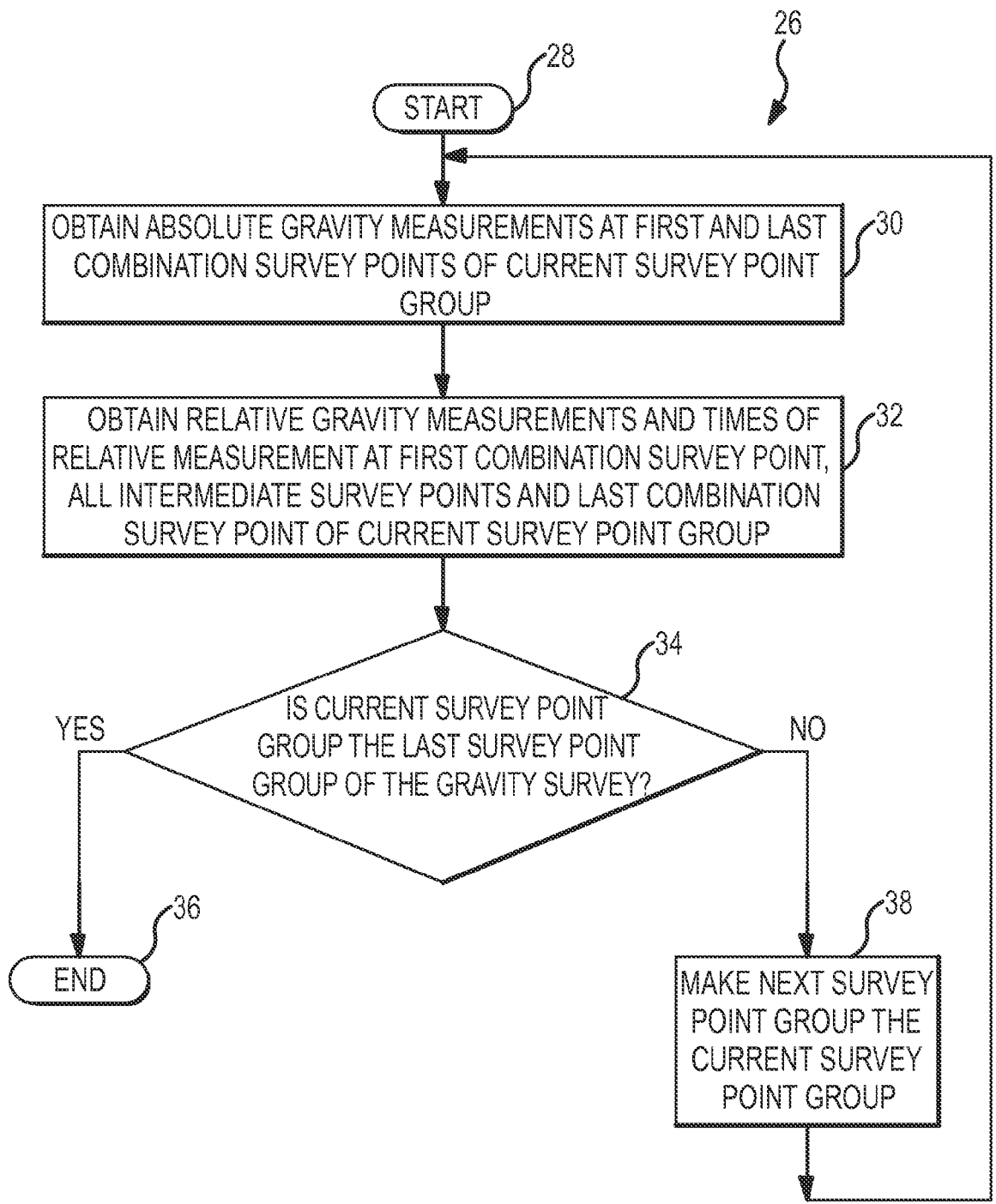
FIG. 3 is a flow chart illustrating of a procedure for obtaining gravity measurements from the survey points shown in FIGS. 1 and 2.

An exemplary process flow 26 for obtaining the gravity measurements for the gravity survey is shown in FIG. 3. The process flow 26 starts at 28. At 30, absolute gravity measurements are obtained at the first and last combination survey points 14a (FIGS. 1 and 2) from the one of the survey point groups, designated as a current survey point group. At 32, the relative gravity measurements and the time of those relative gravity measurements are obtained for each of the first and last combination survey points 14a and all of the intermediate survey points 14b (FIGS. 1 and 2) for the current survey point group. All of the relative gravity measurements at the combination and intermediate survey points should be made in a sequence. That sequence need not be defined by the geographic relationship of the survey points of the current survey point group, but instead is defined by the temporal sequence at which the relative gravity measurements are made. Recording the time at which each relative gravity measurement is made defines the temporal sequence of the relative gravity measurements for the current survey point group. Completing the activities at 30 and 32 results in obtaining the absolute and relative gravity measurements for all of the survey points of the current survey point group.

At 34, a determination is made of whether the current survey point group is the last survey point group in the gravity survey. If the determination at 34 is affirmative, then the process flow 26 ends at 36, because there are no more survey point groups in the gravity survey. If the determination at 34 is negative, indicating that there are other survey point groups in the gravity survey, then the process flow 42 progresses to 38. At 38, the next survey point group in the gravity survey is made the current survey point group, and the process flow 26 returns to 30, where the absolute and relative gravity measurements are made from the combination and intermediate survey points of the next, then-current, survey point group. The process 26 continues to repeat in the manner described until gravity measurements have been obtained from all of the survey points of all of the survey point groups.

Although FIG. 3 describes the process flow 26 for executing an entire gravity survey in terms of multiple survey point groups, the entire gravity survey can be formed by a single survey point group using the same principles. Also, the absolute gravity measurements at the first and last combination survey points of the survey point groups can be made in a number of different temporal relationships, and do not have to be made in conjunction with making all of the gravity measurements at one time for each current survey point group, as illustrated in FIG. 3. The absolute gravity measurements can be made for all of the survey point groups of the entire gravity survey all in one sequence, with no intervening relative gravity measurements made, or the absolute gravity measurements can be made in conjunction with the relative gravity measurements, or a combination of both measurement sequences can be utilized, so long as the absolute gravity measurements are made in a manner which assures that they are accurate for the duration of the entire gravity survey.

Figure 4:
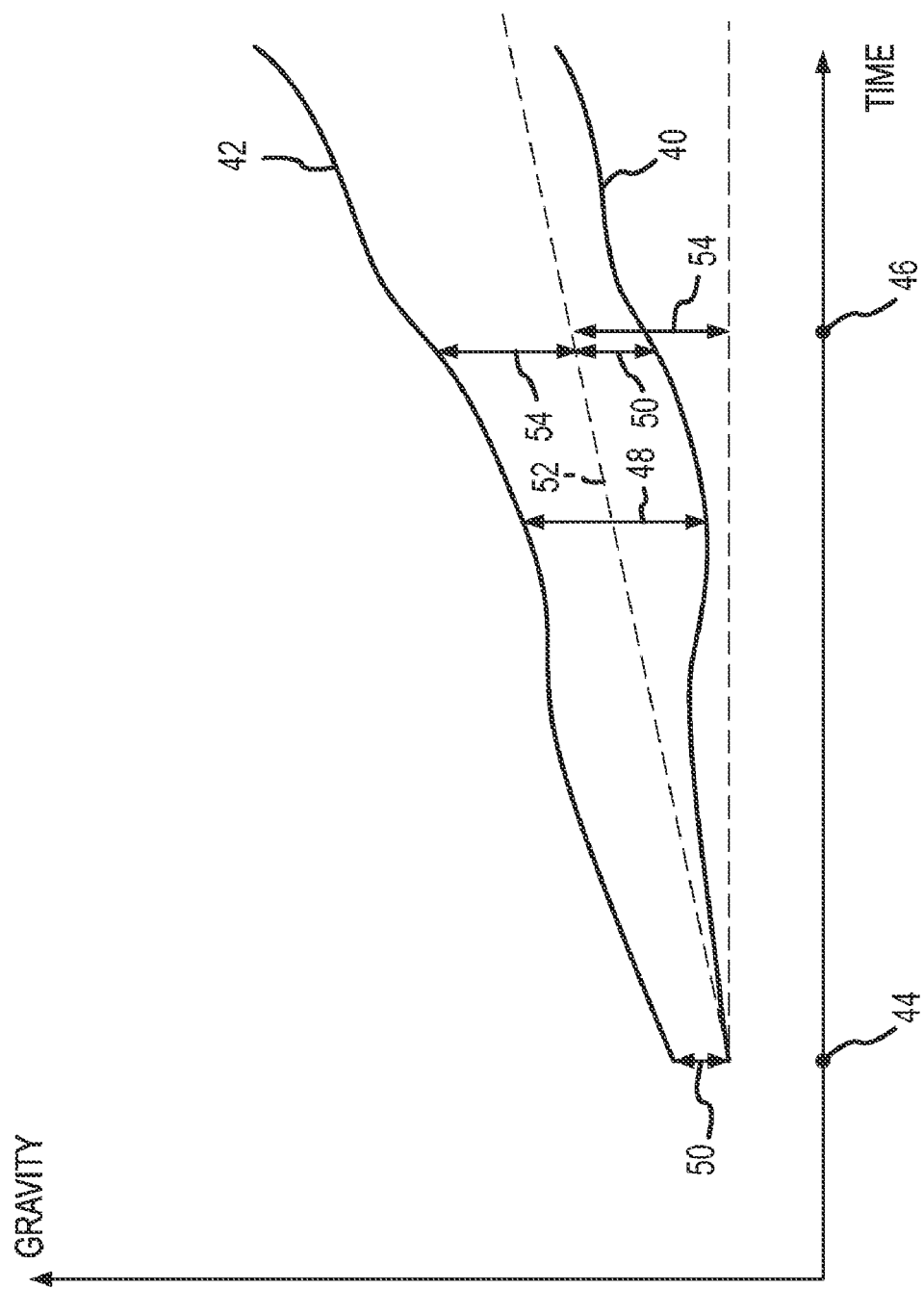
FIG. 4 is an exemplary graph of gravity measurements relative to time measured by absolute and relative gravimeters and which shows the basis for deriving correction factors applied to the relative gravity measurements obtained in accordance with the present invention.

The nature of the error associated with relative gravimeters and relative gravity measurements is understood by reference to FIG. 4. The difference between a relative gravity measurement and an absolute gravity measurement obtained at the same combination survey point 14a (FIGS. 1 and 2) is an error value in the relative gravity measurement. That error value results from the above-described variable influences and is represented by the following equation (A):

$$g_{(relative)} = g_{(absolute)} + g_{(error)} \quad \quad (A)$$

Subtracting the absolute gravity measurement $g_{(absolute)}$ from the relative gravity measurement $g_{(relative)}$ establishes the amount of error $g_{(error)}$ associated with the relative gravimeter at a particular point in time. The error $g_{(error)}$ becomes the correction factor which is applied to the relative gravity measurements to obtain the corrected relative gravity measurements having approximately the accuracy of absolute gravity measurements.

Referring to FIG. 4, absolute gravity measurements made by an absolute gravimeter at a single survey point over time are illustrated by the curve 40, and relative gravity measurements made by a single relative gravimeter at the same single survey point over the same time period are illustrated by the curve 42. The curves 40 and 42 represent the absolute and relative gravity measurements obtainable from an absolute and relative gravimeters between time point 44 at a beginning combination survey point 14a (FIGS. 1 and 2) and at time point 46 at a last combination survey point 14a (FIGS. 1 and 2) of one survey point group. The difference 48 which separates the curves 40 and 42 corresponds to the error $g_{(error)}$ between the absolute gravity measurements and the relative gravity measurements at any particular point in time along the horizontal axis.

It is possible to characterize the error $g_{(error)}$ 48 accurately. The divergence of the absolute and relative gravity measurements 40 and 42, shown in FIG. 4, indicates that the error $g_{(error)}$ 48 is time-dependent. Characterizing the error $g_{(error)}$ 48 for each survey point group is possible using the absolute gravity measurements from the first and last combination survey points and the time at which all of the relative gravity measurements were made. Once characterized mathematically, the error value $g_{(error)}$ 48 for the relative gravimeter becomes the correction factor which is subtracted from the relative gravity measurements obtained from the intermediate survey points 14b (FIGS. 1 and 2). The corrected relative gravity measurements correspond very closely to the absolute gravity values for those intermediate survey points.

A separate value $g_{(error)}$ 48 is calculated as the correction factor for the relative gravity measurements at the intermediate survey points 14b (FIGS. 1 and 2) of each survey point group 22A-22F (FIG. 2). It is for this reason that fresh or up-to-date relative gravity measurements are required for the gravity survey from each survey point group. Using fresh relative gravity measurements assures that the error $g_{(error)}$ 48 is best characterized for each survey point group. The resulting corrected relative gravity measurements have an accuracy approaching that of absolute gravity measurements, but are obtained more quickly, and with less expense than absolute gravity measurements.

The error $g_{(error)}$ 48 may be mathematically characterized as follows. In general, the error value $g_{(error)}$ 48 from the relative gravimeter is formed by an offset value 50 and a drift factor 52 that are unique to the relative gravimeter and the survey point group. The offset value is shown at 50 in FIG. 4. The offset 50 at the time point 44 shown in FIG. 4 is exactly the same as the error $g_{(error)}$ 48 at that time point 44, because there is no time-related influence on the error $g_{(error)}$ 48 at the beginning time point 44 when the gravity survey of the survey point group commences. The offset 50 constitutes the tare of the relative gravimeter. The offset 50 is determined by the difference between the absolute and relative gravity measurements taken for the first combination survey point of each survey point group. The time point 44 corresponds to the time at which the relative gravity measurement was obtained at the first combination survey point.

The drift factor 52 represents the drift in the relative gravity measurements associated with each survey point group due to the variable influences on the relative gravimeter. The drift factor 52 is zero at the time point 44 because the relative gravity measurement is obtained from the first combination survey point of each survey point group at the beginning of the gravity survey of that survey point group, or a previously obtained relative gravity measurement is considered fresh and up-to-date at that survey point. The drift factor 52 for the relative gravity measurements associated with each survey point group is usually at a maximum value at the time that the last relative gravity measurement is obtained from the last combination survey point of each survey point group, at time point 46.

The error $g_{(error)}$ 48 of each relative gravity measurement made at each intermediate survey point 14b (FIGS. 1 and 2) is represented by the following equation (B), where "d" is the drift factor and "t" is time:

$$g_{(error)} = g_{(offset)} + d \times t \quad \quad (B)$$

The drift factor curve 52 progressively increases at a constant linear rate with time, shown by equation (B). The amount of the drift 54 is equal to the drift factor 52 multiplied by time (d×t). At the end of the gravity survey of the survey point group at time point 46, the total error $g_{(error)}$ 48 is the sum of the offset 50 and the amount of drift 54.

The drift 54 represented by curve 52 is the correction factor to correct for the slight natural elongation over time of the spring-like device which suspends the mass in the relative gravimeter, as well as other influences. The elongation increases with time, and that elongation introduces an error into the relative gravity measurements supplied by the relative gravimeter. Although the curve 52 represents the circumstance where the drift linearly increases with time, other types of drift may be applicable to the relative gravity measurements associated with a particular relative gravimeter. For example, the drift may be nonlinear or could even decrease with time if the material of the spring-like device of the relative gravimeter undergoes a material change between the times when the relative gravity measurements are obtained from the first and last combination survey points. Thus, the linear drift factor curve 52 shown in FIG. 4 is for illustration purposes. Although the actual drift of the relative gravity measurements associated with any particular survey point group may or may not be linear, it is usually prudent to model the drift of the relative gravity measurements of each survey point group as changing with respect to time.

Figure 5:
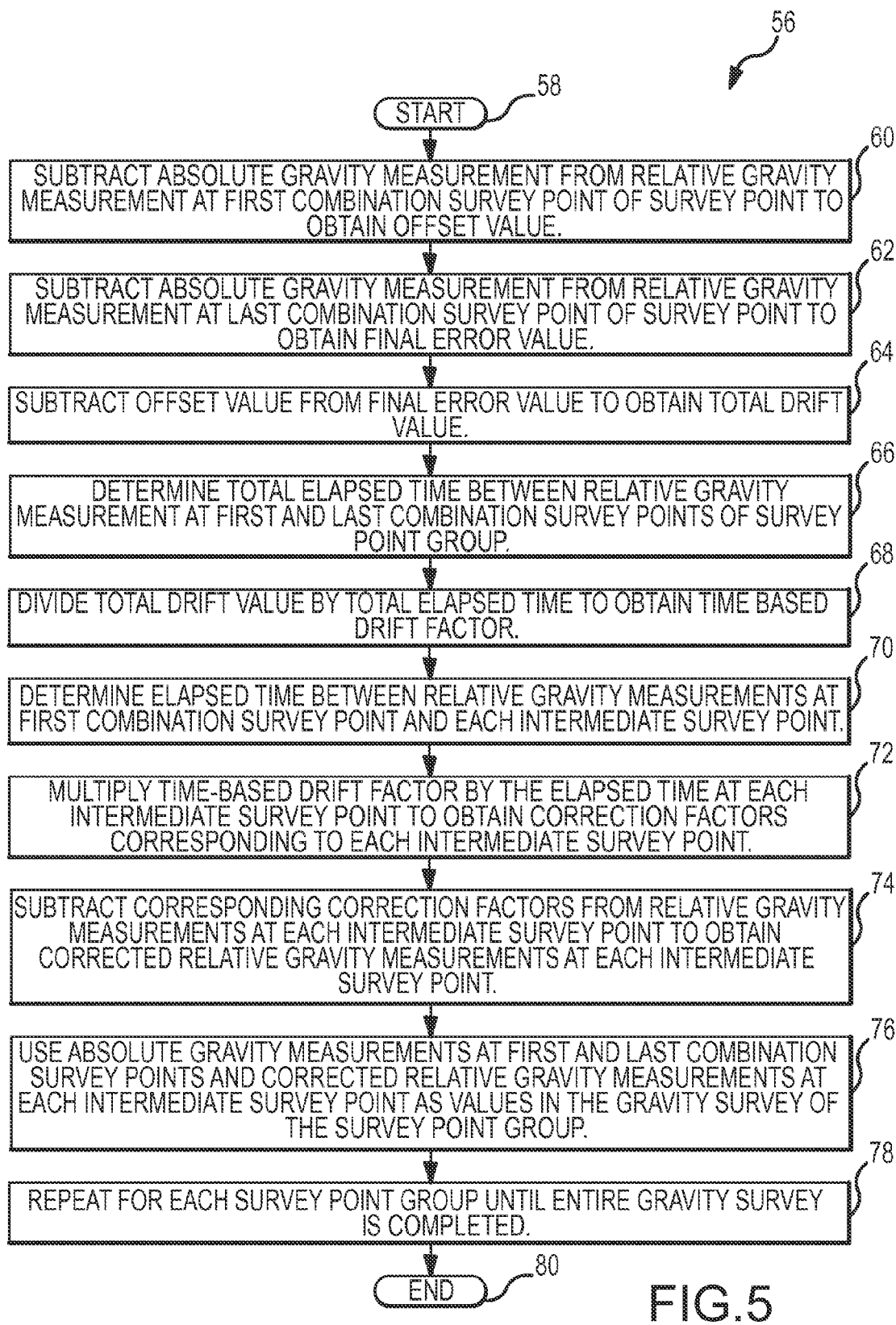
FIG. 5 is a flow chart of one exemplary procedure for correcting the relative gravity measurements in accordance with the present invention.

An exemplary process flow 56 for applying a linear drift correction to the relative gravity measurements obtained from the intermediate survey points of one survey point group is shown in FIG. 5. Applying the process flow 56 results in correcting the relative gravity measurements at the intermediate survey points to an accuracy approaching that of an absolute gravity measurement. Of course, the absolute gravity measurements at the first and last combination survey points of the survey point group are themselves usually accurate and are directly used as the gravity measurements in the gravity survey. Repeating the process flow 56 once per each survey point group completes the gravity survey.

It is advantageous to obtain the first relative gravity measurement at the first or starting combination survey point 14a (FIGS. 1 and 2) of the survey point group, and to obtain the last relative gravity measurement at the last or ending combination survey point 14a of the survey point group. Obtaining the relative gravity measurements in this manner simplifies the derivation of the correction factor for correcting each of the relative gravity measurements at the intermediate survey points 14b (FIGS. 1 and 2). The derivation of the correction factor described below in conjunction with FIG. 5 proceeds on the basis that the first and last relative gravity measurements were made at the starting and ending combination survey points 14a (FIGS. 1 and 2) of the survey point group. However, it is not necessary that the first and last relative gravity measurements be made at the starting and ending combination survey points of the survey point group, but under such circumstances the derivation of the time-related correction factor will be different from yet still follow the basic mathematical procedures described The process flow 56 shown in FIG. 5 starts at 58. At 60, the absolute gravity measurement from the first combination survey point is subtracted from the relative gravity measurement from the first combination survey point to obtain the offset value 50 (FIG. 4). Then at 62, the absolute gravity measurement from the last combination survey point is subtracted from the relative gravity measurement from the last combination survey point to obtain a final error value 48 (FIG. 4). At 64, the initial offset value determined at 60 is subtracted from the final error value determined at 62 to obtain a total drift value 54 (FIG. 4). At 66, the total elapsed time between the relative gravity measurements at the first and last combination survey points 14a (FIGS. 1 and 2) is determined by subtracting the time at which those measurements were made. At 68, the total drift value determined at 64 is divided by the total elapsed time determined at 66 to obtain the time based drift factor 52 (FIG. 4).

At 70, the amount of elapsed time between the relative gravity measurements at the first combination survey point and each of the intermediate survey points of the survey point group is determined. The amount of elapsed time associated with each of the intermediate survey points is different, because the relative gravity measurements made at the intermediate survey points cannot be accomplished simultaneously using the same relative gravimeter. Then at 72, the time based drift factor determined at 68 is multiplied by the amount of elapsed time at each intermediate survey point to obtain correction factors 54 (FIG. 4) corresponding to each of the intermediate survey points. Next at 74, the correction factor for each intermediate survey point determined at 72 is subtracted from or added to (depending on whether the correction factor is positive or negative) the relative gravity measurement at the corresponding intermediate survey point to obtain corrected relative gravity measurements for each of the intermediate survey points.

The corrected relative gravity measurements for the intermediate survey points and the absolute gravity measurements at the first and last combination survey points are then used as the gravity values in the gravity survey for the survey point group, as shown at 76. If there is another survey point group in the entire gravity survey, the same process 56 represented at 60-76 is completed for each other survey point group, as shown at 78. Once all of the survey point groups have been processed in the manner described, the process flow 56 ends at 78.

Another exemplary process flow which can be used to correct the relative gravity measurements of a gravity survey is a least squares technique. Use of the least squares technique results in a single correction factor which minimizes the amount of error or deviation associated with all of the gravity measurements of the gravity survey, in a manner which is well known. Use of the least squares correction technique is applied to the relative gravity measurements at the intermediate survey points, and may even be applied to the absolute gravity measurements of the gravity survey. An exemplary least squares process flow 80 for obtaining corrected gravity measurements is shown in FIGS. 6A-6B.

Figure 6A:
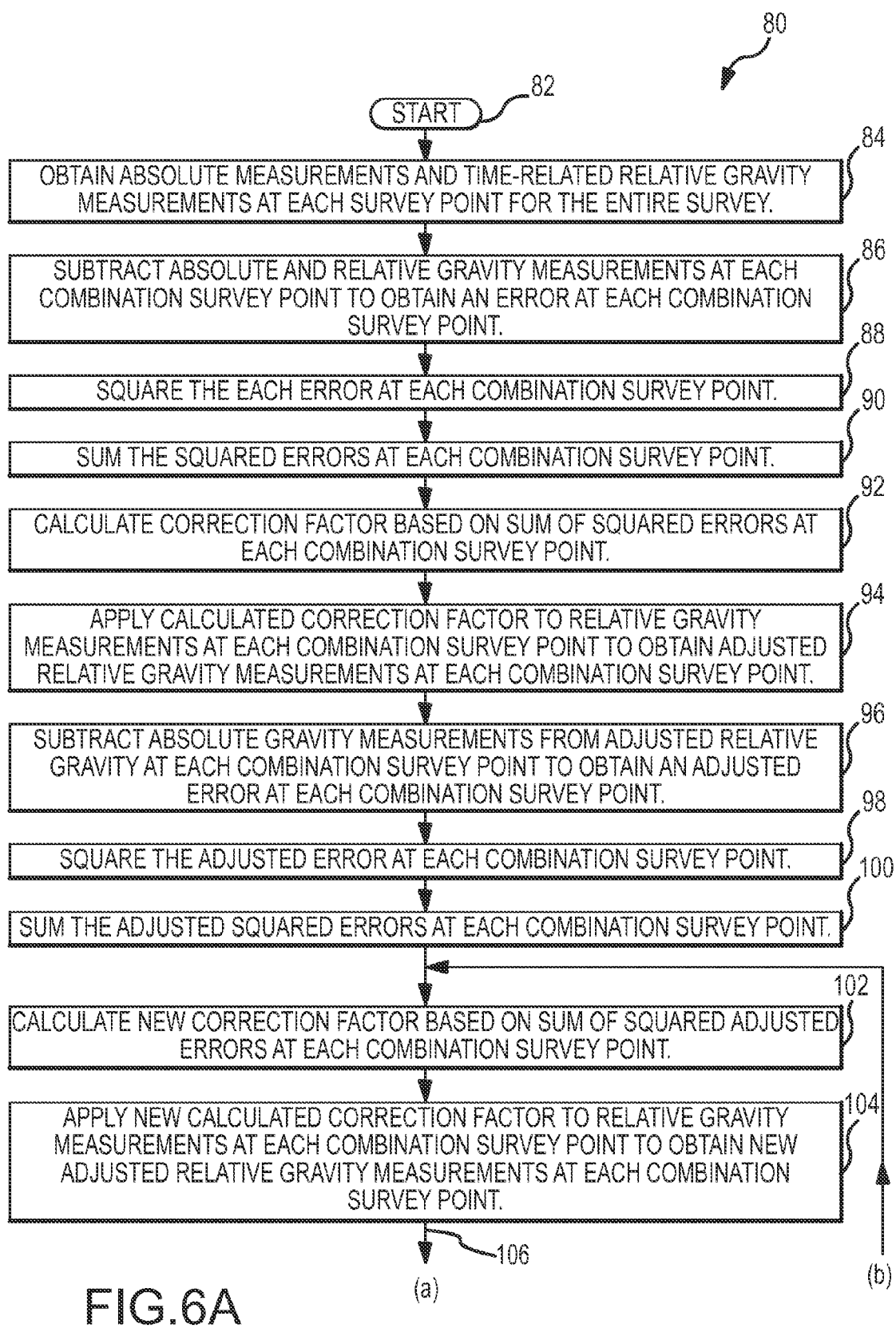
FIGS. 6A and 6B form a single flow chart of an alternative exemplary procedure from that shown in FIG. 5 for correcting the relative gravity measurements.
Figure 6B:
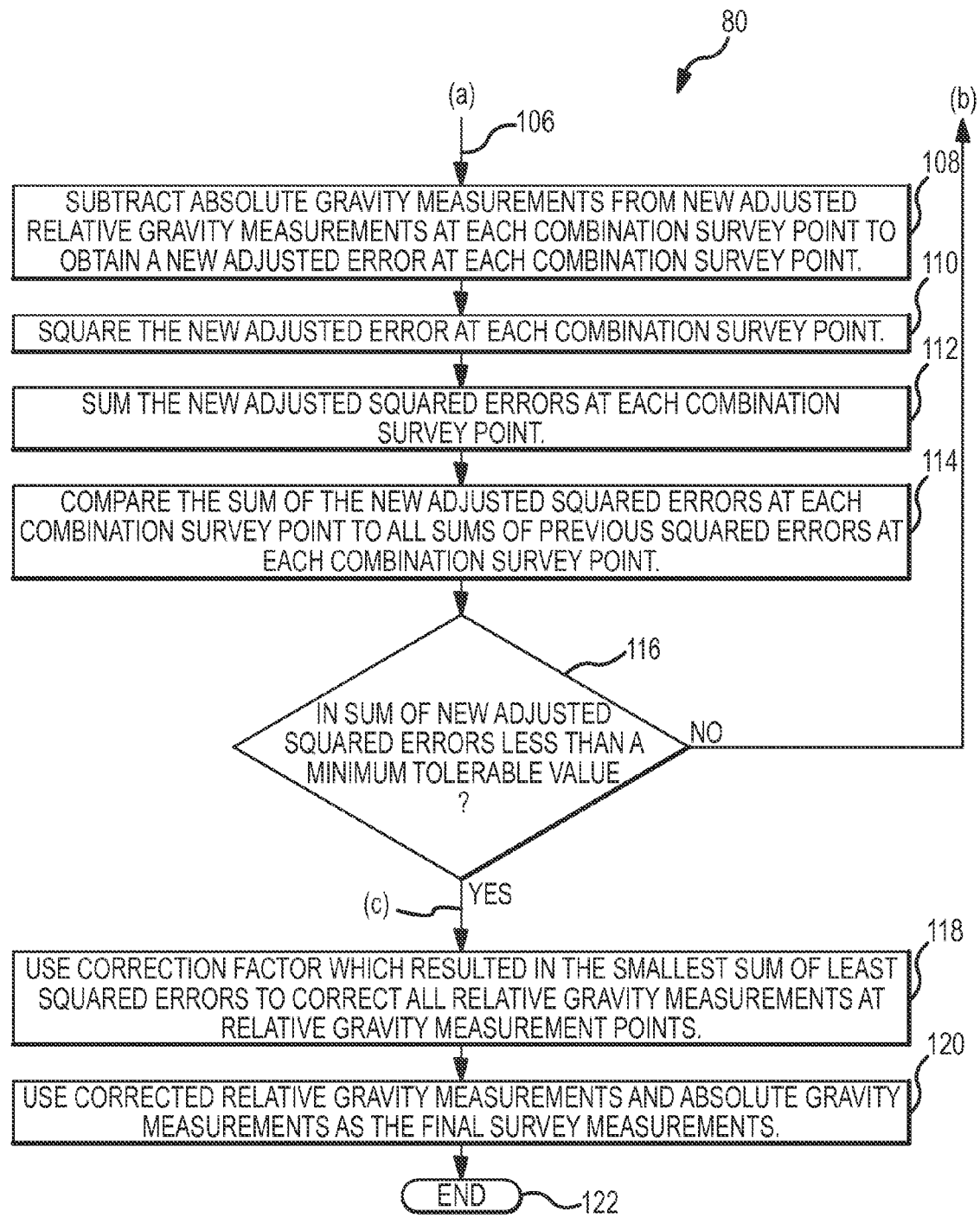

The process flow 80 shown in FIGS. 6A and 6B starts at 82. At 84, absolute gravity measurements are obtained from the combination survey points and relative gravity measurements are obtained from each of the combination and intermediate survey points of the gravity survey. The absolute gravity measurements are then subtracted from the relative gravity measurements obtained at each combination survey point, at 86, to obtain an error for each combination survey point. The errors for each combination survey point are then squared at 88. At 90, the squared errors are summed to obtain a sum of the square errors. A correction factor based on the sum of square errors is then determined at 92. The correction factor determined at 92 can be achieved by well-known mathematical techniques, or even by trial and error. The correction factor determined that 92 is then applied, at 94, to the relative gravity measurements obtained from each combination survey point to obtain adjusted relative gravity measurements for each combination survey point. At 96, the absolute gravity measurements are subtracted from the adjusted relative gravity measurements for each combination survey point to obtain an adjusted error for each combination survey point. The adjusted errors are then squared, at 98, to obtain squared adjusted errors. The squared adjusted errors are then summed to obtain a sum of the squared adjusted errors at 100. A new correction factor based on the sum of the squared adjusted errors is then calculated or determined at 102, using well-known techniques. The new calculated correction factor obtained at 102 is then applied to the relative gravity measurements for each combination survey point, at 104, to obtain new adjusted relative gravity measurements for each combination survey point.

The process flow 80 continues from 104 shown in FIG. 6A to 108 shown in FIG. 6B. At 108, the absolute gravity measurements are subtracted from the new adjusted relative gravity measurements for each combination survey point to obtain new adjusted errors for each combination survey point. The new adjusted errors are then squared, at 110, to obtain new squared adjusted errors for each combination survey point. The new squared adjusted errors are then summed to obtain a new sum of the squared adjusted error at 112. At 114, the new sum of the squared adjusted errors is then compared to all of the previous summed squared adjusted errors derived at 100 (FIG. 6A). A determination is then made at 116 whether the new sum of the squared adjusted errors is less than a minimum tolerable value.

If the determination at 116 is negative, the process flow 80 returns from 116 to 102 (FIG. 6A), where a different new correction factor is calculated or established at 102, applied at 104, and otherwise used at 108, 110, 112 and 114 in the same manner as previously described to determine whether the new sum of adjusted square errors is less than a minimum tolerable value at 116 adjusted. The loop from the negative determination at 116 to the activities beginning at 102 is repeated until the sum of the new adjusted square errors is less than a minimum tolerable value, resulting in an affirmative determination at 116.

When the determination at 116 is affirmative, the process flow 80 continues to 118. At 118, the correction factor which resulted in the minimum tolerable value of the sum of the squared error values is used to obtain corrected relative gravity measurements for the intermediate survey points of the gravity survey. At 120, the thus-corrected relative gravity measurements and the absolute gravity measurements are used in the gravity survey as the final survey measurements. The process flow 80 ends at 122.

Figure 7:
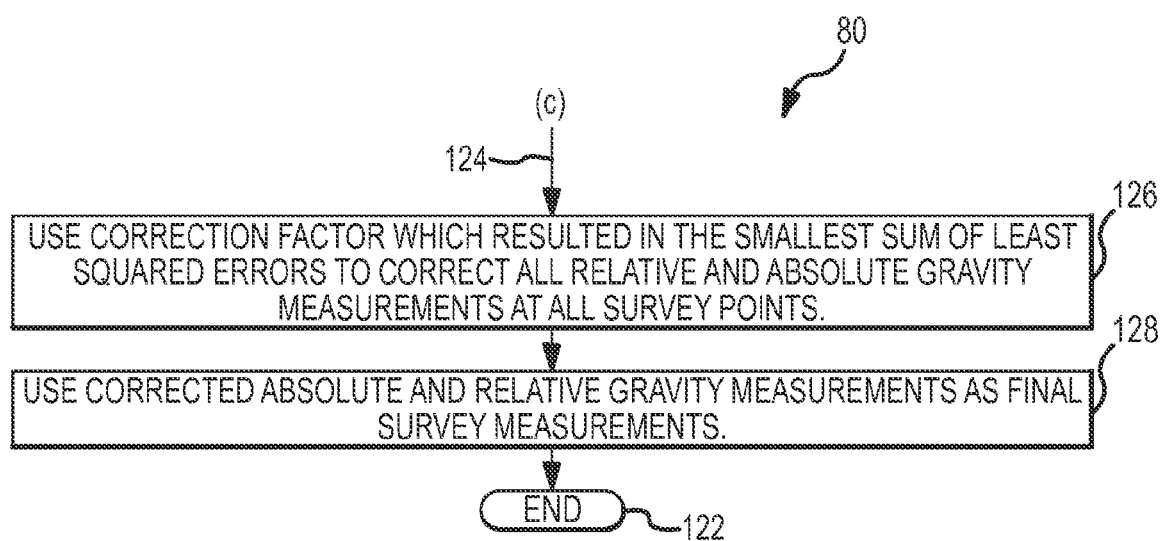
FIG. 7 is a partial flow chart showing an alternate ending of the procedure shown in FIGS. 6A and 6B.

The use of the process flow 80 results in a single correction factor may also be applied only to the relative gravity measurements, as shown in FIGS. 6A and 6B, or the single correction factor may also be applied to the absolute gravity measurements, as is shown in FIG. 7, which represents an alternative to the ending functions 118 and 120 shown in FIG. 6B. An affirmative determination at 116 causes the correction factor which resulted in the minimum tolerable sum of the squared errors at 114 (FIG. 6B) to be used to correct the absolute gravity measurements in addition to being used 25 to correct the relative gravity measurements for all of the survey points as shown at 126. The corrected absolute and relative gravity measurements are then used as the final survey measurements for the gravity survey, as shown at 128. The alternate ending of the process flow 80 shown in FIG. 7 thereafter ends at 122.

Obtaining gravity measurements using both absolute and relative gravimeters in accordance with the present invention results in corrected relative gravity measurements for each of the intermediate survey points of the survey point group. These corrected relative gravity measurements have a corrected accuracy approaching that of absolute gravity measurements, without the increased time and more difficult, expensive and tedious and difficult or impossible tasks of using absolute gravimeters in the gravity survey. The gravity survey is completed without the requirement of looping as in previous gravity surveys using relative gravimeters, thereby further reducing the costs of conducting the survey, while still obtaining a high level of accuracy. Other advantages and improvements are achieved by using the present invention.

Presently preferred embodiments of the present invention and many of its improvements have been described with a degree of particularity. This description is of preferred examples for implementing the invention and is not necessarily intended to limit the scope of the invention beyond the scope of the following claims.

What is claimed:

1. A method of conducting a gravity survey using an absolute gravimeter and a relative gravimeter, comprising:
   identifying a plurality of survey points from which to obtain gravity measurements for the gravity survey;
   obtaining relative gravity measurements at each of the survey points using the relative gravimeter;
   dividing the plurality of survey points into a subset of a lesser plurality of survey points each designated as a combination survey point;
   obtaining absolute gravity measurements at each of the combination survey points using the absolute gravimeter;
   comparing the relative gravity measurements and the absolute gravity measurements at each of the combination survey points;
   determining a correction factor related to any difference between the relative and absolute gravity measurements at each of the combination survey points;
   using the absolute gravity measurements as accurate values of the gravity at the combination survey points in the gravity survey;
   designating those survey points which are not combination survey points as intermediate survey points;
   correcting the relative gravity measurements made at the intermediate survey points using the correction factor; and
   using the corrected relative gravity measurements as accurate values of gravity at the intermediate survey points in the gravity survey.

2. A method as defined in claim 1, further comprising:
determining the correction factor as a value which varies as a function of time.

3. A method as defined in claim 2, further comprising:
correcting the relative gravity measurements in relation to the time that the relative gravity measurements were obtained.

4. A method as defined in claim 1, further comprising:
determining a correction factor related to any difference between the relative and absolute gravity measurements at each of the combination survey points by a least squares method.

5. A method as defined in claim 1, further comprising:
recording the time when each of the relative gravity measurements is obtained at each of the survey points; and
adjusting the correction factor applied to correct each of the relative gravity measurements in relation to the time at which each of the relative gravity measurements was obtained at each intermediate survey point.

6. A method as defined in claim 1, further comprising:
obtaining only one relative gravity measurement at each survey point.

7. A method as defined in claim 1, further comprising:
designating a plurality of the survey points as a survey point group;
including in the survey point group at least two combination survey points and at least one intermediate survey point; and
determining the correction factor for the relative gravity measurements included in each survey point group as related to any difference between the relative and absolute gravity measurements at each of the two combination survey points of the survey point group.

8. A method as defined in claim 7, further comprising:
designating a plurality of the survey points as a plurality of separate survey point groups; and
including one combination survey point as a common combination survey point within the plurality of separate survey point groups.

9. A method as defined in claim 8, further comprising:
including in each survey point group, a plurality of intermediate survey points.

10. A method as defined in claim 9, further comprising:
recording the time when each of the relative gravity measurements is obtained at each of the survey points of each survey point group; and
adjusting the correction factor applied to correct each of the relative gravity measurements of each survey point group in relation to the time at which each of the relative gravity measurements was obtained at each intermediate survey point of each survey point group.

11. A method as defined in claim 10, further comprising:
obtaining only one relative gravity measurement at each survey point of each survey point group.

12. A method as defined in claim 4, wherein the least squares method comprises:
calculating an error value for each combination survey point based on the difference between the relative and absolute gravity measurements;
squaring the calculated error values;
summing the squared calculated error values to obtain an original summed squared error value; and
determining a correction factor, which when applied to the calculated error values results in an adjusted summed squared error value which is less than the original summed squared error value, the adjusted summed squared error value being the sum of the squares of the calculated error values with the correction factor applied.

13. A method of conducting a gravity survey, comprising:
identifying a plurality of different survey points from which to obtain gravity measurements;
establishing a plurality of survey point groups, each survey point group comprising a first combination survey point, at least one intermediate survey point, and a last combination survey point;
obtaining relative gravity measurements from each of the survey points of each survey point group starting at the first survey point and ending at the last survey point of each survey point group;
obtaining absolute gravity measurements from the first and last combination survey points of each survey point group;
determining a correction factor for each survey point group from the difference between the relative and absolute gravity measurements obtained at each combination survey point;
applying the correction factor for each survey point group to the relative gravity measurements from the intermediate survey points of each survey point group to obtain corrected gravity measurements for those intermediate survey points; and
using the corrected gravity measurements as the gravity measurements for the intermediate survey points in the gravity survey; and
using the absolute gravity measurements as the gravity measurements for the combination survey points in the gravity survey.

14. A method as defined in claim 13, further comprising:
including as a survey point of a first survey point group, a combination survey point which is also a survey point of a second different survey point group, the combination survey point designated as a shared combination survey point.

15. A method as defined in claim 14, further comprising:
using the same absolute gravity measurement obtained at the shared combination survey point in determining the correction factors related to the first and second survey point groups.

16. A method as defined in claim 15, further comprising:
using the same relative gravity measurement obtained at the shared combination survey point in determining the correction factors related to the first and second survey point groups.

17. A method as defined in claim 13, further comprising:
using a plurality of relative gravimeters to obtain the relative gravity measurements from the survey point groups of the gravity survey; and
using one relative gravimeter to obtain the relative gravity measurements at the survey points of one survey point group; and
using a different relative gravimeter to obtain that relative gravity measurements at the survey points of a different survey point group.

18. A method as defined in claim 13, further comprising:
recording the time at which each of the relative gravity measurements is obtained.

19. A method as defined in claim 18, further comprising:
determining a length of total time elapsed between obtaining the relative gravity measurements at the first and last combination survey points for each of the plurality of survey point groups;
determining lengths of intermediate time elapsed between obtaining the relative gravity measurements at the first survey point and each of the intermediate survey points for each survey point group;
determining a correction factor for each survey point group based on the difference between the relative and absolute gravity measurements at the first and last combination survey points in each group;
determining a time based correction factor for each survey point group by dividing the correction factor by the total elapsed time for each survey point group; and
creating corrected relative gravity measurements by subtracting any difference between the absolute and relative gravity measurements at the first combination survey point from each of the relative gravity measurements made at each of the intermediate survey points and thereafter multiplying the value of such subtraction by the time based correction factor.

20. A method of conducting a gravity survey using a relative gravimeter and an absolute gravimeter, comprising:
identifying a plurality of at least three different survey points;
grouping the survey points into a survey point group;
obtaining relative gravity measurements from the survey points in the survey point group using the relative gravimeter;
obtaining absolute gravity measurements from at least two of the survey points in the survey point group using the absolute gravimeter; and
correcting the relative gravity measurements obtained from the survey points where absolute gravity measurements were not obtained, based on a difference between the absolute and relative gravity measurements obtained at the survey points where absolute gravity measurements were obtained.

21. A method as defined in claim 20, further comprising:
recording the time at which the relative gravity measurements were obtained for each survey point group; and
correcting the relative gravity measurements obtained from the survey points where absolute gravity measurements were not obtained based on the elapsed time between the relative gravity measurement obtained at one of the survey points where an absolute gravity measurement was also obtained and the time when the relative gravity measurement was made at the survey point where an absolute gravity measurement was not obtained.

* * * * *